No. 876,492. PATENTED JAN. 14, 1908.
O. A. ROSS.
TROLLEY POLE CONTROLLER.
APPLICATION FILED JAN. 12, 1906.
3 SHEETS—SHEET 2.
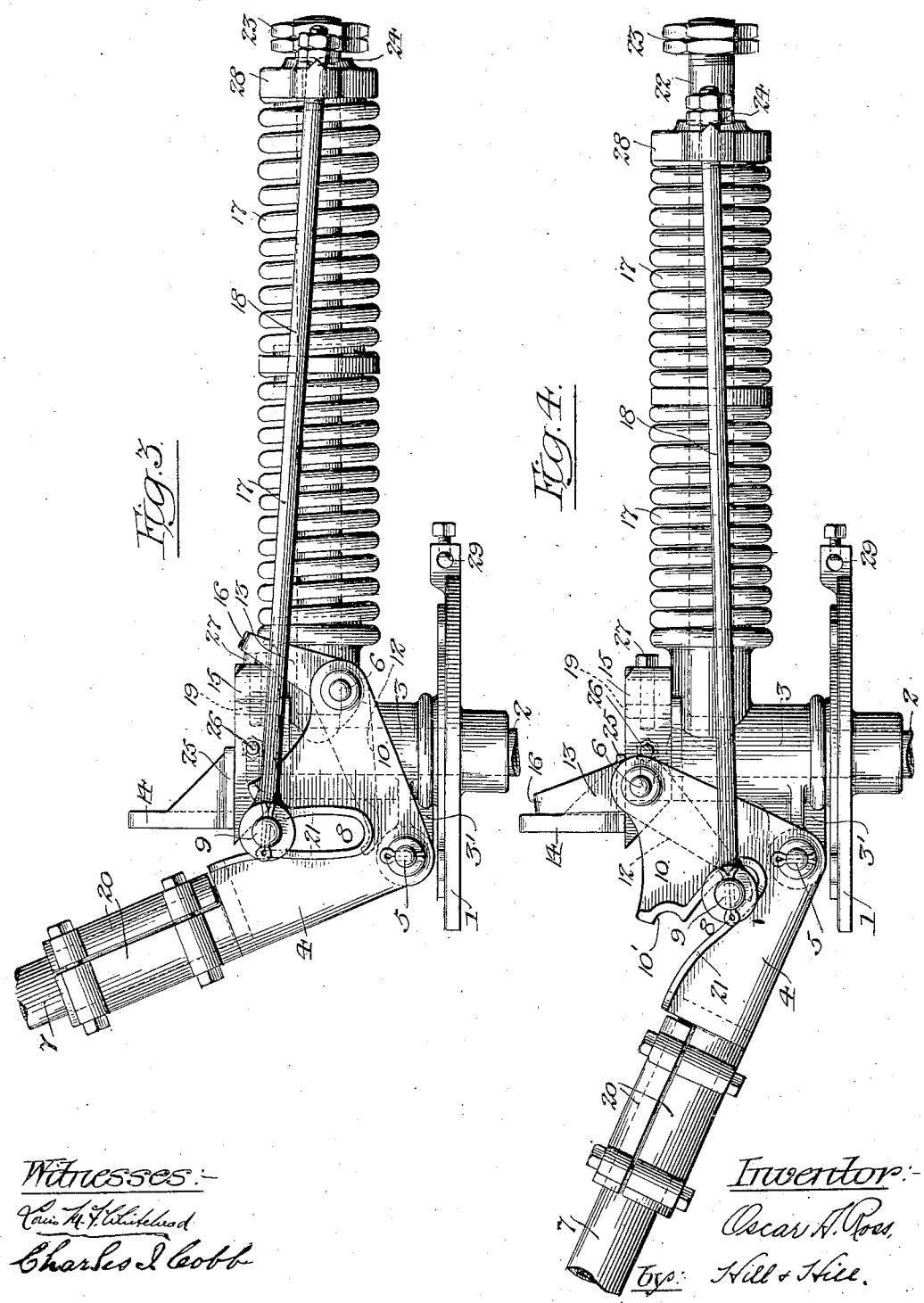

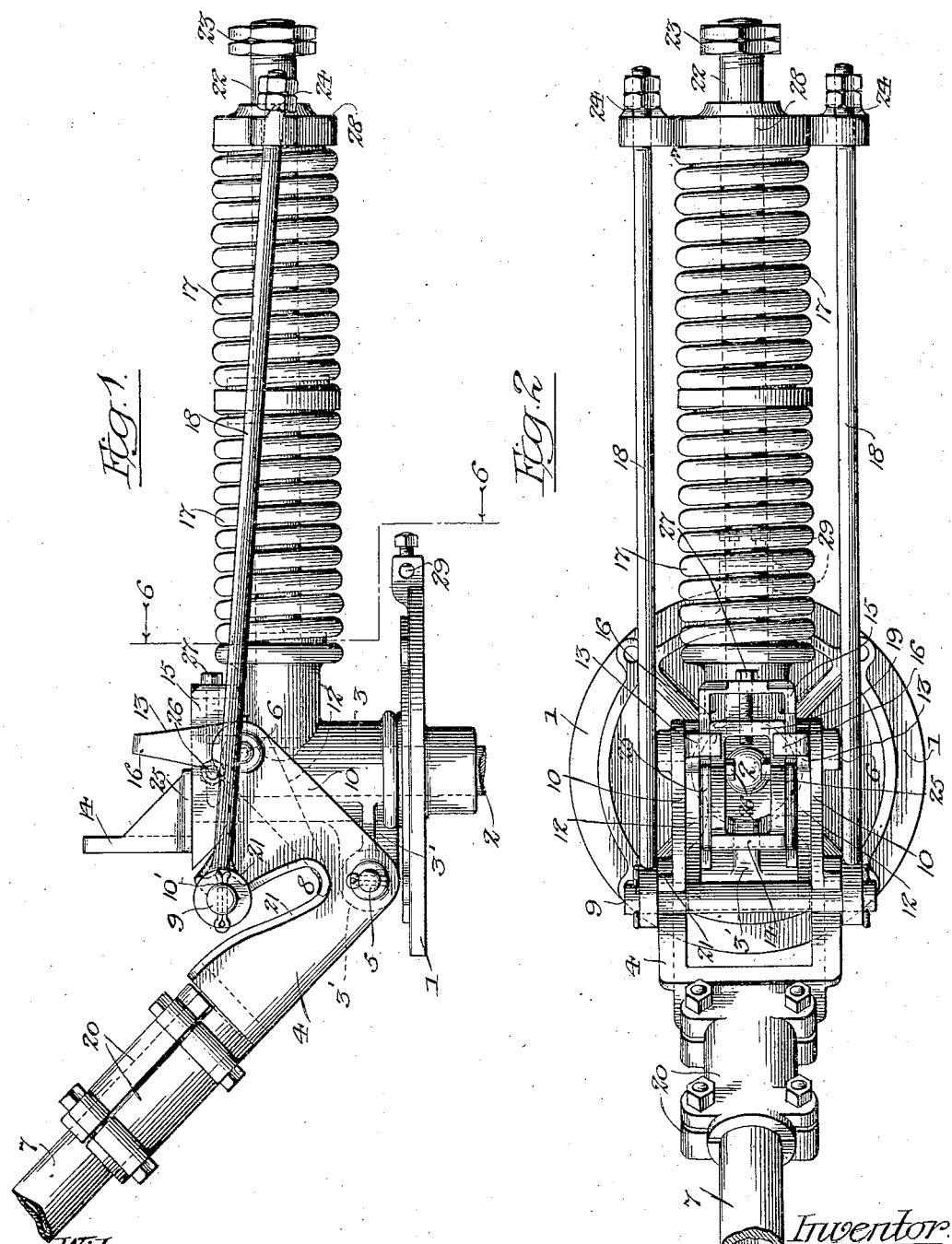

No. 876,492. PATENTED JAN. 14, 1908.
O. A. ROSS.
TROLLEY POLE CONTROLLER.
APPLICATION FILED JAN. 12, 1906.
3 SHEETS—SHEET 3.
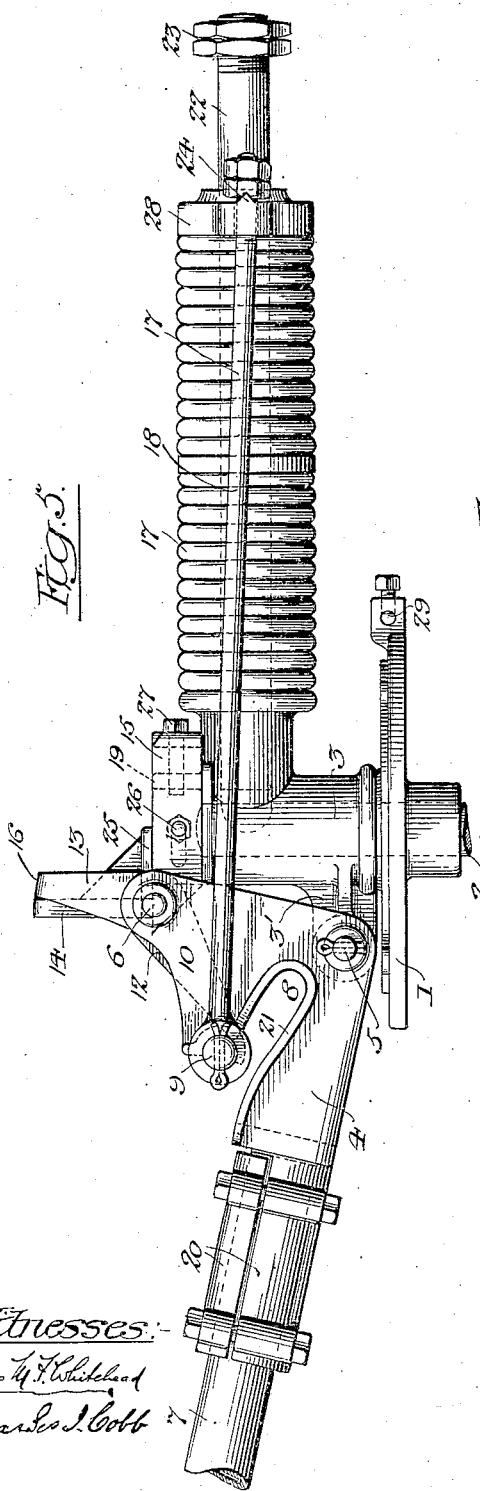
Witnesses:—
Inventor:—
Oscar A. Ross,
By:— Hill & Hill
Attys

UNITED STATES PATENT OFFICE.

OSCAR A. ROSS, OF CHICAGO, ILLINOIS.

TROLLEY-POLE CONTROLLER.

No. 876,492.  Specification of Letters Patent.  Patented Jan. 14, 1908.

Application filed January 12, 1906. Serial No. 295,702.

*To all whom it may concern:*

Be it known that I, OSCAR A. ROSS, a citizen of the United States, residing at Chicago, in the county of Cook and State of Illinois, have invented certain new and useful Improvements in a Trolley-Pole Controller, of which the following is a description.

My invention belongs to that class of devices known as trolley pole controllers or retrievers, and has for its object the production of a simpler, cheaper and more efficient device for the purposes set forth.

This controller is placed in any convenient or preferred place on a car or other vehicle, and preferably serves as the base of the trolley pole. When the common form of trolley and base are used, and the trolley wheel jumps from the trolley wire, there is great danger of injuring the cross-wires and overhead supports, as well as the trolley pole itself, and consequently causing perhaps injury to persons and property in the vicinity. In my device, the trolley pole after jumping off, immediately drops down below the trolley wire, and remains in a position below the wire until thrown back into a normal position. My controller is also arranged to be adjustable so that the point at which it will allow the pole to drop, is above the highest point in the line.

To this end my invention consists of the novel arrangement, construction, and combination of parts herein shown and described, and more particularly pointed out in the claims.

In the drawings wherein like reference characters indicate like or corresponding parts; Figure 1 is a side elevation of the preferred form of my device, the trolley pole being in a normal position, that is on the wire in operative position, (complete trolley pole and wire not shown). Fig. 2 is a top view of the same. Fig. 3 is a side elevation of the same, showing the position of the parts immediately after the trolley wheel has jumped the wire. Fig. 4 is a side elevation of the same, showing the position of the parts the trolley pole having dropped to a position below the trolley wire. Fig. 5 is a side elevation of the same, showing the manner of returning the pole to a normal position. Fig. 6 is a cross-sectional view taken on line 6—6 of the preferred form shown in Fig. 1.

Referring to the drawings, 3 is a base preferably secured to a car or the like, where a device of this kind is used, by means of the stand 1 and pin 2, giving the base 3 a swivel movement. This pin 2 is secured to the part 1 in any preferred or suitable manner. The weight of the base 3 and the trolley pole in practice is found sufficient to keep the base on its position on the stand, it is obvious however that any suitable means may be employed to positively prevent the same from becoming unseated if it is so desired.

In my preferred form of construction, I clamp a member 4 on the lower end of the pole, said member 4, having an extension 10, the two parts forming a bell crank 4—10. This bell crank 4—10 is pivotally secured to the base at the point 5, by means of the pin 5. It is obvious that the pole 7 and the bell crank 4—10 may be made integral, but the preferred construction is to make them in two parts and clamp the same together by means of the clamp 20, or other suitable means.

The pole 7 is held in a normal position (see Fig. 1) on the trolley wire (not shown) by exerting a pressure on the arm 10 of the bell crank. As is shown in the drawings this pressure is supplied by means of the springs 17—17, through the rods 18—18 and pin 9, to the depression or seat 10' of the arm 10. As the pole 7 leaves the trolley wire, the springs 17—17 cause the pole to pivot about 5 and rise until the pin 9, comes in contact with the disengaging extension 15 on the base 3, (see Fig. 3). As shown, the extension 15 is preferably made adjustable upon the base 3, being held in place by means of the guides 25 and bolts 26. Further movement of the pole upward about the point 5, causes the pin to be pushed out of its seat at the point 10', and the weight of the pole overcoming the leverage and resiliency of the springs drops, so that the pin 9 takes a position in the clearance 8 as is shown in Fig. 4. To give greater wearing surface the bell cranks 4—10 are provided with a flange or increased surface 21 along the depression 8 and seat 10'. In this position the trolley wheel and the upper end of the pole is now below the trolley wire. By making the part 15 adjustable, it is obvious that the height at which the pole will drop or be released will be varied to suit the highest point in the line. The bolt 27, assists in the adjustment, and gives a firmer construction.

The springs 17 are preferably of the usual type employed in devices of this kind, and are placed on the rod 22, said rod being preferably hollow. To transmit the pressure of the springs to the rods 18, I use a sliding cap 28, the travel being limited by lock-nuts 23, or their equivalent. In my preferred construction, I provide substantially knife edges 24, for the rods 18, 18 to pull on, thus allowing for the movements of the rods, as the pin 9 moves. Any other suitable means may be provided to accomplish this result.

A convenient way of attaching the conducting wires to the stand is shown at 29, the wires passing through the hole and held in place by the screws.

To return the pin 9 to its normal position in the seat at 10', I preferably provide an extension or stop 14 on the base 3, and also the bell cranks 12—13, which are pivotally secured at the point 6 to the arm 10 of the bell cranks 4—10, in any suitable manner. On the upper part of these bell cranks are suitable extensions 16, 16, adapted to engage the stop 14 when the device is operated, as is more fully explained in the operation of the controller.

Having thus described the construction and arrangement of the preferred form of my device, the operation is as follows. Referring to Fig. 1, in which the trolley wheel is in a position on the wire, the tension of the springs 17, 17 exerted through the rods 18, 18, to the pin 9, and thus to the arm 10 of the bell crank, tends to pull the trolley pole up, and hence resiliently hold the wheel of the trolley against the wire. As the wheel jumps from the wire the pole assumes a position as is shown in Fig. 3. The pin 9 is thrown into contact with the end of the disengaging member 15, and is forced out and down from its seat in the extended part of the bell crank arm 10. The pin 9 then drops into the lower part of the depression 8 and takes the position substantially as shown in Fig. 4, the weight of the pole causing it to drop into the position shown (see Fig. 4). When the pin 9 falls into the clearance 8, the sliding member 28 seats against stop 23, thus relieving member 9 of any pressure so that it will readily drop into the clearance. The pole is now in a position below the trolley wire and cross-wires. It is observed that the lugs 16 on the end of the bell crank arm 13 are in contact with the extension 14, while the pin 9 is resting on the arm 12 of the bell crank. If now the trolley pole 7 is pulled down as indicated in Fig. 5, the pin 6 moves about the pin 5 and the lugs 16 or suitable extensions on the arms 13, 13 of the bell cranks 12—13, 12—13, contact with the extension or stop 14 and operate said bell crank, the end 12 of the bell crank 12—13 forcing the pin 9 back to its seat in a normal position the tension of the springs tend to force the trolley pole up and hold it into contact again with the trolley wire.

Having thus described my invention it is obvious that various immaterial changes may be made in the construction, and arrangement of the various parts of my device as for instance modifying the knife edges 24, or design of the base or bell cranks, without departing from the spirit of my invention, hence I do not wish to be understood as limiting myself to the exact construction shown.

What I claim as new, and desire to secure by Letters Patent is:—

1. In a device of the kind described, a base and a trolley pole, in combination with resilient retaining means, a supporting member provided with two retaining seats therein adapted to support the pole at different angles of inclination, and means for changing the retaining means from one seat to the other, consisting of a disengaging member and a reëngaging member carried by the said supporting member.

2. In a device of the kind described, a pivotally supported trolley pole with a bell crank extension provided with a seat for engagement with a resilient connecting member, and a movable resilient connecting member coöperating with said seat, in combination with adjustable means for forcing said member from its seat when the pole is disengaged from its engagement with the wire permitting the pole to drop below the said wire, and means for normally restoring said connecting member to its seat.

3. A device of the kind described, comprising a base, a trolley pole pivotally supported upon the base provided with a bell crank extension with a depression near its free end and a receding clearance between said depression and the trolley pole, in combination with resilient means for retaining the pole in a normal position provided with a movable member adapted to be positioned in said depression when said pole is in its normal position, and when forced therefrom to move along said clearance, and means for forcing said movable member out of the depression when the trolley pole rises above its normal position.

4. A device of the kind described, comprising a stand, a base, a trolley pole pivotally supported upon the base provided with a bell crank extension with a seat near its free end and a receding clearance between the said seat and the trolley pole, in combination with means for retaining the pole in a normal position provided with a movable member adapted to be positioned in said seat when the said pole is in its normal position, and when forced therefrom to move along said clearance, means for forcing said movable member out of its seat when the trolley pole rises above its normal position, and means for returning the movable member to its seat.

5. A device of the kind described, comprising a stand, a base, a trolley pole pivotally supported upon the base provided with a bell crank extension with a seat near its free end and a clearance between the said seat and the trolley pole, a bell crank lever pivotally supported upon said extension with the free end of one arm extended to and traveling in the plane of said clearance and a stop arranged in the path of the other arm of said bell crank, in combination with means for retaining the pole in a normal position provided with a movable member adapted to be positioned in said seat when the pole is in a normal position, and means for forcing the said movable member out of its seat when the pole rises above its normal position.

6. In a device of the kind described, a base and a trolley pole in combination with a supporting member provided with two retaining seats, one arranged above the other, resilient means arranged to operatively coöperate with said seats, means for automatically disengaging the resilient means from the upper retaining seat when the pole rises above the trolley wire and permitting it to automatically sit in the lower seat, and means for restoring the resilient means for engagement with said supporting member at the upper retaining seat by a downward pull upon the free end of the pole.

7. A device of the kind described, comprising a base, a trolley pole pivotally supported upon said base and provided with an upwardly turned bell crank arm at its lower end having a seat near its free end, in combination with resilient means adapted to normally engage the trolley pole at the seat in said arm and maintain the trolley pole normally in contact with a trolley wire, and a cam faced member adapted to disengage the said resilient means and the trolley pole when said pole rises above its normal position.

8. A device of the kind described, comprising a base, a trolley pole pivotally supported upon said base and provided at its lower end with an upwardly turned bell crank arm having a seat near its free end, in combination with resilient retaining means adapted to normally engage the trolley pole at the seat in said arm, an adjustable cam faced member adapted to disengage said retaining means and pole when the pole rises above its normal position on the trolley wire, means carried by said bell crank arm adapted to engage the retaining means and a suitable stop to form a compound lever and reëngage the trolley pole and retaining means by a downward pull on the free end of said pole.

9. A device of the kind described, comprising a base, a trolley pole pivotally supported upon said base and provided with an upwardly turned extension at its lower end having a seat near the free end thereof, in combination with retaining means for normally holding the pole in contact with a trolley wire, consisting of a movable member adapted to normally engage the pole at the seat in said extension, resilient means, and suitable means for connecting said resilient means and movable member, an extension on said base adapted to engage the movable member and force it out of its seat when the pole rises above its normal position, members pivotally secured to said pole extension adapted to engage the movable member and replace it in its seat by a downward pull on the free end of said pole.

10. A device of the kind described, comprising a stand, a base vertically pivoted on said stand, a trolley pole and bell crank arm provided with two retaining depressions therein clamped to the lower end of said trolley pole and pivotally secured to the base, tension means connecting said base to the bell crank arm, at one of the depressions therein, and means carried by said base for changing the leverage of said tension means on the bell crank arm by shifting the point of adjustment of said connecting means on said bell crank arm from one depression to the other.

11. A device of the kind described, comprising a stand, a base pivotally supported upon said stand, a trolley pole pivotally secured to said base, means for retaining said pole in operative position on a line wire consisting of resilient members, a yoke and rods connecting said yoke to the pole, an adjustable cam faced member adapted to change the point of attachment of the retaining means on the pole and permit the pole to drop below its operative position.

12. In a device of the kind described, the combination of a stand, a base supported upon said stand, a trolley pole pivotally secured to said base and provided with a plurality of seats for engagement with retaining means, retaining means consisting of springs, a sliding yoke provided with knife edges for engaging connecting rods, and connecting rods, an adjustable cam faced extension on the base adapted to change the point of attachment of the retaining means on the pole when the pole rises above its operative position, and means for restoring the said retaining means to the operative point of attachment on the pole by a downward pull on the free end of said pole.

13. In a device of the kind described, the combination of a base and means for pivotally supporting the same, a trolley pole pivotally secured to said base and provided with a plurality of places for the attachment of retaining means, retaining means for holding the pole in operative position on a line wire consisting of springs, a yoke provided with knife edges, connecting rods and a movable member for engaging the pole, a cam faced extension on said base adapted to change the point of attachment of the retaining means on the pole when the same rises above its operative position and cause it to automatically retrieve, and means adapted to coöperate with the base, the pole and the retaining means when the pole is given a downward pull on its free end after being retrieved, and return the retaining means to its operative point of attachment.

14. In a device of the kind described, a pivotally supported trolley pole provided with an extension at the lower end thereof, said extension arranged with a retaining depression therein and a receding clearance between said depression and trolley pole, and a movable, resilient connecting member coöperating with said retaining depression, in combination with means for forcing said movable member into said clearance when the pole rises above its operative position, and means for operatively restoring said connecting member to the retaining depression.

In testimony whereof, I have hereunto signed my name in the presence of two subscribing witnesses.

OSCAR A. ROSS.

Witnesses:
 Roy W. Hill,
 Charles I. Cobb.